United States Patent
Kawahata et al.

(10) Patent No.: US 9,692,104 B2
(45) Date of Patent: Jun. 27, 2017

(54) COMMUNICATION DEVICE, COMMUNICATION METHOD, AND A COMPUTER-READABLE RECORDING MEDIUM

(71) Applicants: Yukiyasu Kawahata, Tokyo (JP); Yoshihiko Yamamoto, Tokyo (JP)

(72) Inventors: Yukiyasu Kawahata, Tokyo (JP); Yoshihiko Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 338 days.

(21) Appl. No.: 14/386,999

(22) PCT Filed: Mar. 27, 2013

(86) PCT No.: PCT/JP2013/058922
§ 371 (c)(1),
(2) Date: Sep. 22, 2014

(87) PCT Pub. No.: WO2013/146846
PCT Pub. Date: Oct. 3, 2013

(65) Prior Publication Data
US 2015/0042515 A1     Feb. 12, 2015

(30) Foreign Application Priority Data
Mar. 28, 2012   (JP) .................. 2012-074629

(51) Int. Cl.
*G01S 5/02*     (2010.01)
*H01Q 1/12*     (2006.01)
*H04B 7/185*    (2006.01)

(52) U.S. Cl.
CPC ........... *H01Q 1/1257* (2013.01); *H04B 7/185* (2013.01)

(58) Field of Classification Search
CPC ....................................................... G01S 3/325
(Continued)

(56) References Cited

U.S. PATENT DOCUMENTS

| 4,920,350 A | 4/1990 | McGuire et al. |
| 7,999,738 B2 | 8/2011 | Melconian et al. |
| 2001/0002821 A1 | 6/2001 | Katou et al. |

FOREIGN PATENT DOCUMENTS

| JP | 8 103039 | 4/1996 |
| JP | 8 265625 | 10/1996 |

(Continued)

OTHER PUBLICATIONS

Office Action issued Apr. 14, 2015 in Japanese Patent Application No. 2014-507944 (with English language translation).

(Continued)

*Primary Examiner* — Dao Phan
(74) *Attorney, Agent, or Firm* — Oblon, McClelland, Maier & Neustadt, L.L.P.

(57) ABSTRACT

A transmission system that can continue communication even if a tracking error exists and to reduce interference on other transponders when transmitting a video and audio between an endstation facility and another endstation facility via a transponder mounted on communications satellite. This transmission system includes a tracking antenna that tracks a transponder, a tracking error calculation circuit that obtains a tracking error in a tracking operation of the tracking antenna, a transmission level control circuit that obtains a transmission level of a signal in response to the tracking error, and a transmitter that transmits the signal at the obtained signal level via the tracking antenna to the transponder of the communication target.

9 Claims, 8 Drawing Sheets

(58) Field of Classification Search
USPC .......... 342/77, 359, 420, 427, 426; 343/754, 343/757
See application file for complete search history.

(56) References Cited

FOREIGN PATENT DOCUMENTS

| | | |
|---|---|---|
| JP | 2001 166032 | 6/2001 |
| TW | 185025 B | 6/1992 |
| TW | 441202 B | 6/2001 |
| TW | 200423585 A | 11/2004 |

OTHER PUBLICATIONS

Combined Office Action and Search Report issued Nov. 14, 2014 in Taiwanese Patent Application No. 102110824 (with English language translation and English translation of Category of Cited Documents).

Fujino, Y., et al., "Development of Helicopter Satellite Communication System for the Disaster Information Transmission", The Transactions of the Institute of Electronics, Information and Communication Engineers, vol. J91-B, No. 12, pp. 1611-1619, (Dec. 1, 2008).

International Search Report Issued Apr. 23, 2013 in PCT/JP13/058922 Filed Mar. 27, 2013.

Mexican Office Action issued Aug. 27, 2015 in Patent Application No. 2014/011474 (with English Translation).

| TRACKING ERROR α (°) | TRANSMISSION LEVEL A |
|---|---|
| −20～−10 | 0.6 |
| −10～−5 | 0.8 |
| −5～+5 | 1.0 |
| +5～+15 | 0.85 |
| +15～+25 | 0.7 |
| +25～+35 | 0.5 |

FIG.6C $\alpha \geqq 0 \quad A = f1(\alpha)$ $\alpha < 0 \quad A = f2(\alpha)$

COMMUNICATION DEVICE, COMMUNICATION METHOD, AND A COMPUTER-READABLE RECORDING MEDIUM

TECHNICAL FIELD

The present invention relates to a communication device, a communication method and a program.

BACKGROUND ART

When communicating between communication devices via a transponder mounted on a communications satellite, each communication device needs to maintain a communication line between the communication device and the transponder during the communication. For this reason, a conventional communication device maintains a communication line by tracking a transponder with a tracking antenna.

A tracking antenna tracks a communications satellite with high precision and always operates to face directly toward a communications satellite. However, there are cases in which the tracking antenna has a tracking error (error angle) alpha from a direction to be oriented depending on the level of fluctuation of the tracking signal in a transmission path or the performance of a receiver.

When the tracking antenna has a tracking error alpha, the tracking antenna, during transmission, radiates the strongest radio wave toward a direction shifted by the angle alpha from the tracking communications satellite. In this case, the radio wave radiating to the other communications satellite adjoining to the communications satellite to be tracked may become stronger than the radio wave radiated when the tracking error alpha is 0, interferes communication functions of the other communications satellite, and may block communication operations.

In order to prevent such an interference, the communication device includes a transmitting device that prevents from interfering other satellites, the transmitting device having an interlock function for blocking transmissions when the tracking error alpha of the tracking antenna exceeds a certain value.

Moreover, as a technique that automatically tracks a communication target to be tracked and that can avoid communication interruption, Patent Literature 1 discloses a system that tracks a directional antenna by combining the directional antenna and a non-directional antenna and exchanging information, such as the oriented direction, position information and the receiving condition of the directional antenna, between the transmitter and receiver using the non-directional antenna. Suppressing the tracking error alpha is theoretically possible by applying this technique.

However, in this system, only a range communicable with a non-directional antenna is a communicable area. Thus, in order to enlarge the communicable area, the transmission power via the non-directional antenna should be increased and this leads to an inefficient system. Therefore, it is not preferable to apply this technique to the satellite communication.

CITATION LIST

Patent Literature

Patent Literature 1: Unexamined Japanese Patent Application Kokai Publication No. H08-265625

SUMMARY OF INVENTION

Technical Problem

In order to transmit mass data such as video, audio data and/or the like, it is effective to perform high-speed transmission using a directive antenna. However, as mentioned above, in using the directive antenna, the directive antenna may possibly interfere with transponders mounted on surrounding communications satellites due to the tracking error alpha. When a transmitted signal is blocked in order to avoid an interference, a situation will occur during communication in which communication lines are suddenly interrupted.

The present invention is made in view of the above-mentioned actual condition, and an objective of the invention is to continue communication and suppress interferences with communication devices other than the intended communication device.

Solution to Problem

In order to achieve the above-mentioned purpose, a communication device according to the present invention includes:

a tracking antenna that tracks a destination communication device;

a tracking error determining unit that obtains a tracking error in the tracking operation of the tracking antenna;

a transmission level determining unit that obtains a transmission level in response to the obtained tracking error; and a transmitter that transmits a transmission signal via the tracking antenna to the destination communication device with energy corresponding to the obtained transmission level.

Advantageous Effects of Invention

According to the present invention, even if a tracking error has occurred, communication to the destination communication device can be continued, and interferences with the communication devices other than the destination communication device can be alleviated.

DESCRIPTION OF EMBODIMENTS

Hereinafter, with reference to drawings, the transmission system according to the embodiment of the present invention is explained.

Figure 1:
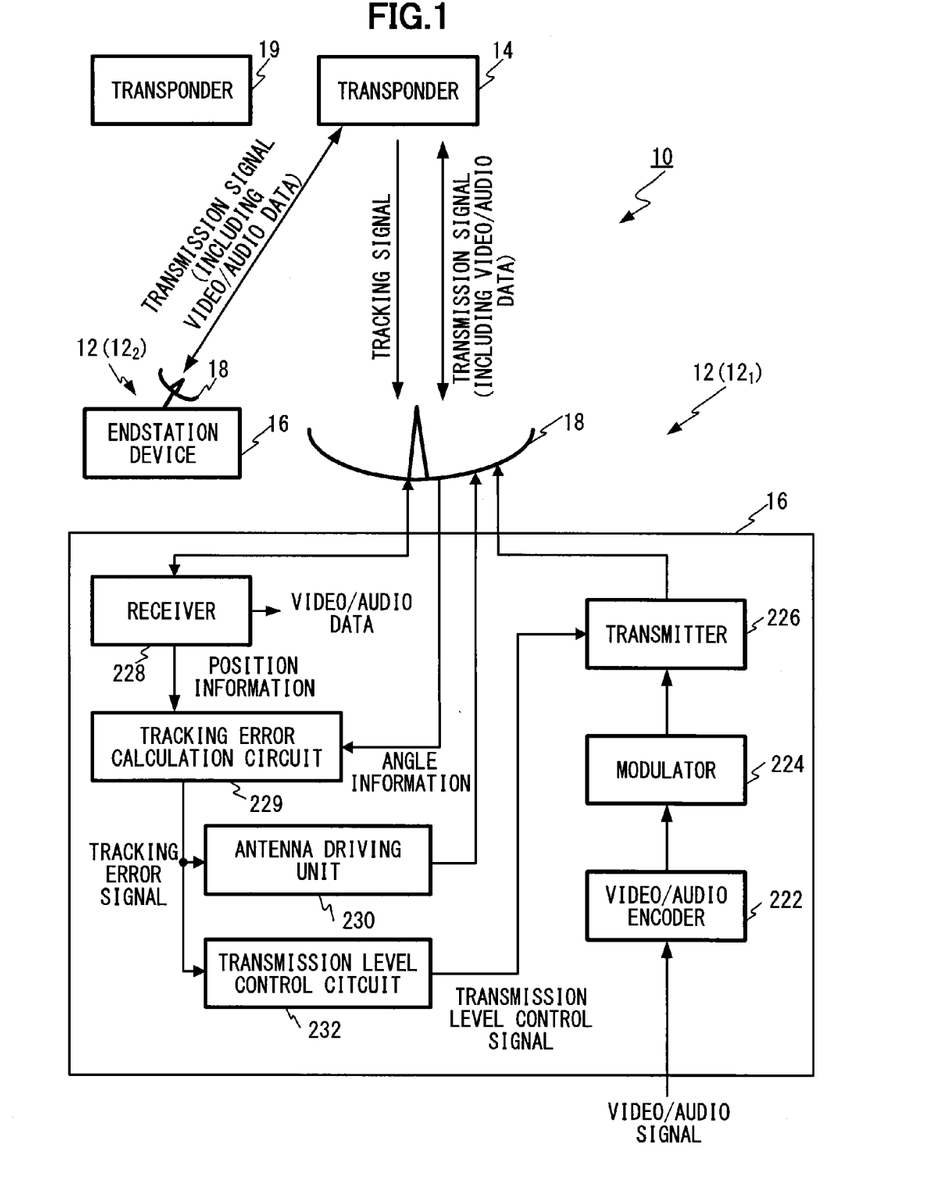
FIG. 1 is a block diagram of a transmission system according to an embodiment of the present invention.

As shown in FIG. 1, the transmission system 10 according to this embodiment includes a plurality of endstation facilities $12_1$ and $12_2$ and a communications satellite including a transponder 14.

The endstation facilities $12_1$ and $12_2$ mutually transmits data to and from the partner endstation facilities $12_2$ and $12_1$ via the transponder 14. That is, the endstation facilities $12_1$ and $12_2$ and the transponder 14, as a communication device, communicate with other communication devices. In addition, in order to understand easily, FIG. 1 shows only two endstation facilities 12. However, more than two endstation facilities 12 may be arranged. In addition, the endstation facilities $12_1$ and $12_2$ are generically referred to as an endstation facility 12.

Each endstation facility 12 is installed on the ground, includes an endstation device 16 and a tracking antenna 18, functions as a communication device, and communicates with the transponder 14 which is a communication device.

Figure 2:
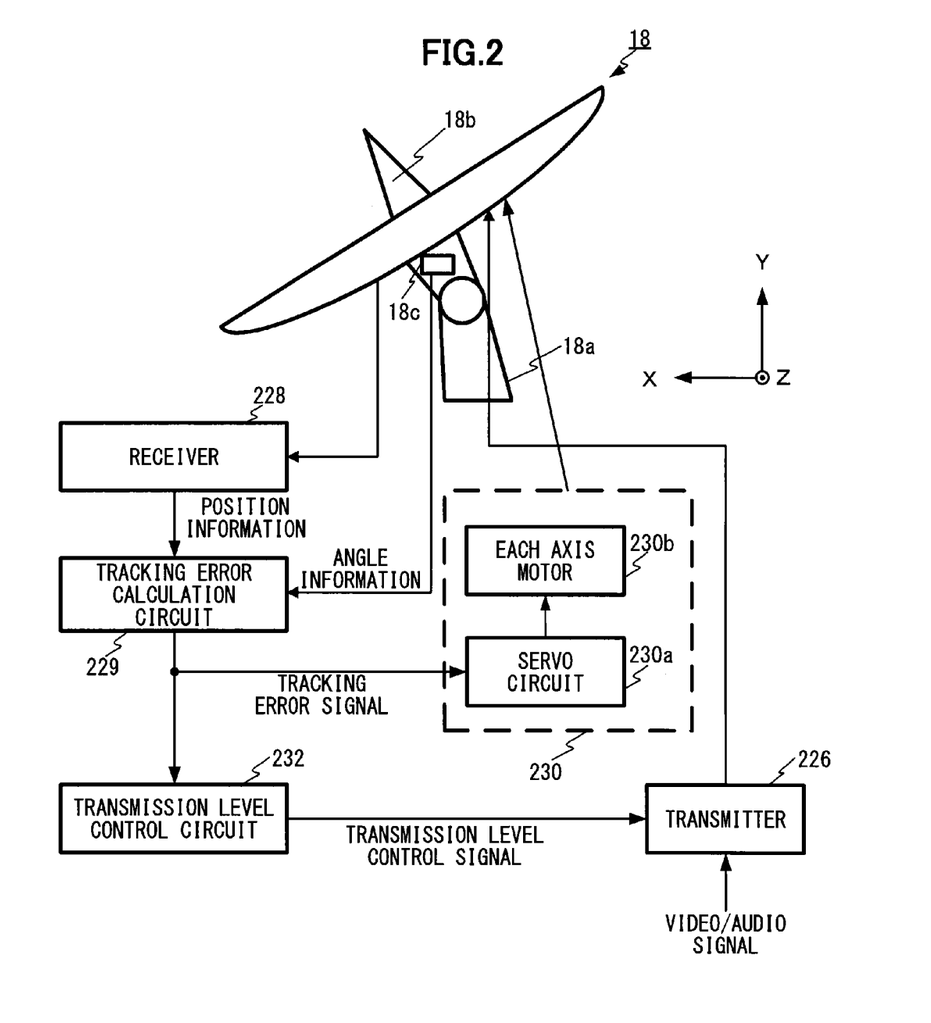
FIG. 2 is a block diagram of an endstation device of the transmission system shown in FIG. 1.

The tracking antenna 18 includes, as shown in FIG. 2, an antenna stand 18a, an antenna main body 18b, and an angle sensor 18c. In addition, in the following explanation X, Y and Z axes in FIG. 2 are defined as follows: The X-axis is defined as a horizontal axis and the Y-axis is defined as a perpendicular axis on a vertical plane including the tracking antenna 18 and a communications satellite having the transponder 14 to be tracked. Further, the Z-axis is defined as an axis perpendicular to the X-axis and the Y-axis.

The antenna stand 18a is installed on the ground, and supports the antenna main body 18b.

The antenna main body 18b can be rotated around the perpendicular axis (Y-axis), and around the horizontal axis (Z-axis), tracks the transponder 14, wirelessly transmits a signal from a transmitter 226, receives a signal transmitted from other endstation facility 12 via the transponder 14 and supplies the signal to a receiver 228.

Moreover, the antenna main body 18b receives a tracking signal transmitted from the transponder 14, and supplies this to the receiver 228.

The angle sensor 18c is installed onto the antenna main body 18b, and generates angular information of each axis, that is, the information indicating the orientation of the antenna main body 18b.

On the other hand, the endstation device 16, as shown in FIG. 1, includes a video and audio encoder 222, a modulator 224, a transmitter 226, a receiver 228, a tracking error calculation circuit 229, an antenna driving unit 230, and a transmission level control circuit 232.

The video and audio encoder 222 encodes a video signal by the Moving Picture Experts Group 4 Part 10 Advanced Video Coding (MPEG4) standard, moreover, encodes an audio signal by the Advanced Audio Coding (MPEG 2 AAC) standard or the like, and outputs generated encoded signals to the modulator 224.

The modulator 224 modulates a carrier signal in accordance with a predetermined modulation method using the encoded signal supplied from the video and audio encoder 222 as a baseband signal, and outputs the modulated signal.

Figure 3:
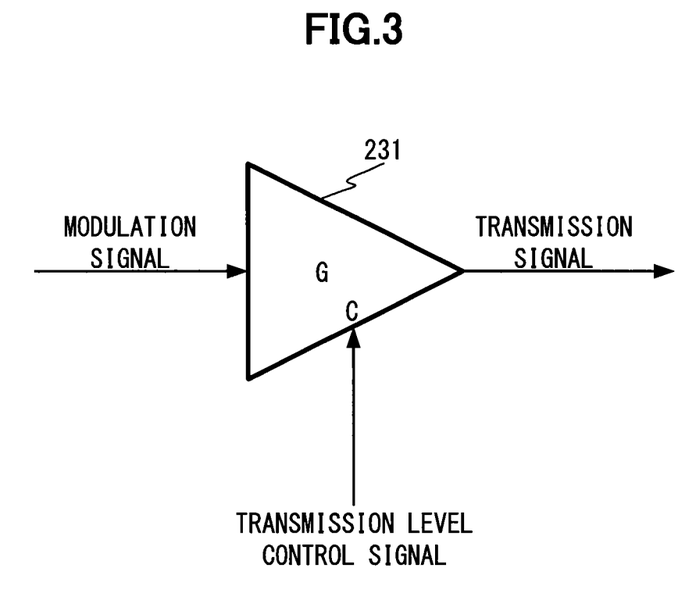
FIG. 3 is a diagram explaining the configuration of a variable power amplifier arranged at a transmitter.

The transmitter 226 includes, as shown in FIG. 3, a variable power amplifier (transmitting amplifier) 231, amplifies the modulated signal supplied from the modulator 224 up to a transmission level at an amplification factor G indicated by the transmission level control signal which is supplied to a control terminal C from the transmission level control circuit 232, and supplies the amplified and modulated signal to the antenna main body 18b.

The receiver 228 shown in FIG. 2 receives a transmission signal (video and audio data is included), which is transmitted from the other endstation facility 12 via the transponder 14 and received by the antenna main body 18b, demodulates the transmission signal, and outputs a video and audio signal.

The receiver 228 receives a tracking signal, which is transmitted from the transponder 14 and received by the antenna main body 18b, demodulates the tracking signal, and outputs position information indicating the position of the transponder 14 to the tracking error calculation circuit 229.

In response to the position information (demodulated tracking signal) from the receiver 228, the tracking error calculation circuit 229 having functions as a tracking error determining unit, receives angular information of each axis from the angle sensor 18c, that is, information indicating the orientation of the antenna main body 18b, obtains the error angle (Yθ, Zθ) between the orientation of the antenna main body 18b and the orientation where the transponder 14 exists as a tracking error alpha, and outputs the tracking error signal indicating this error angle to the antenna driving unit 230 and the transmission level control circuit 232.

The antenna driving unit 230 includes, as shown in FIG. 2, a servo circuit 230a and motors 230b for each axis.

The servo circuit 230a drives the motors (motors for each axis) 230b arranged at each axis of XYZ of the tracking antenna 18 so that the error angle (Yθ, Zθ) in each axis orientation indicated by the tracking error signal becomes 0. Thereby, the tracking antenna 18 tracks the transponder 14 (communications satellite on which the transponder 14 is mounted). Motors 230b for each axis are arranged at each axis of the tracking antenna 18 and change the orientation of the antenna main body 18b through the instructions from the servo circuit 230a.

The transmission level control circuit 232 has functions as a transmission level determining unit, and controls the amplification factor G stored in the transmitter 226 in response to the magnitude of the tracking error alpha indicated by the tracking error signal.

More specifically, the transmission level control circuit 232 obtains a tracking error alpha around the Y-axis and controls the amplification factor G set in the variable power amplifier 231 in the transmitter 226 to decrease as the absolute value of the tracking error alpha increases.

This point is explained in detail with reference to FIGS. 4 to 5B.

Figure 4:
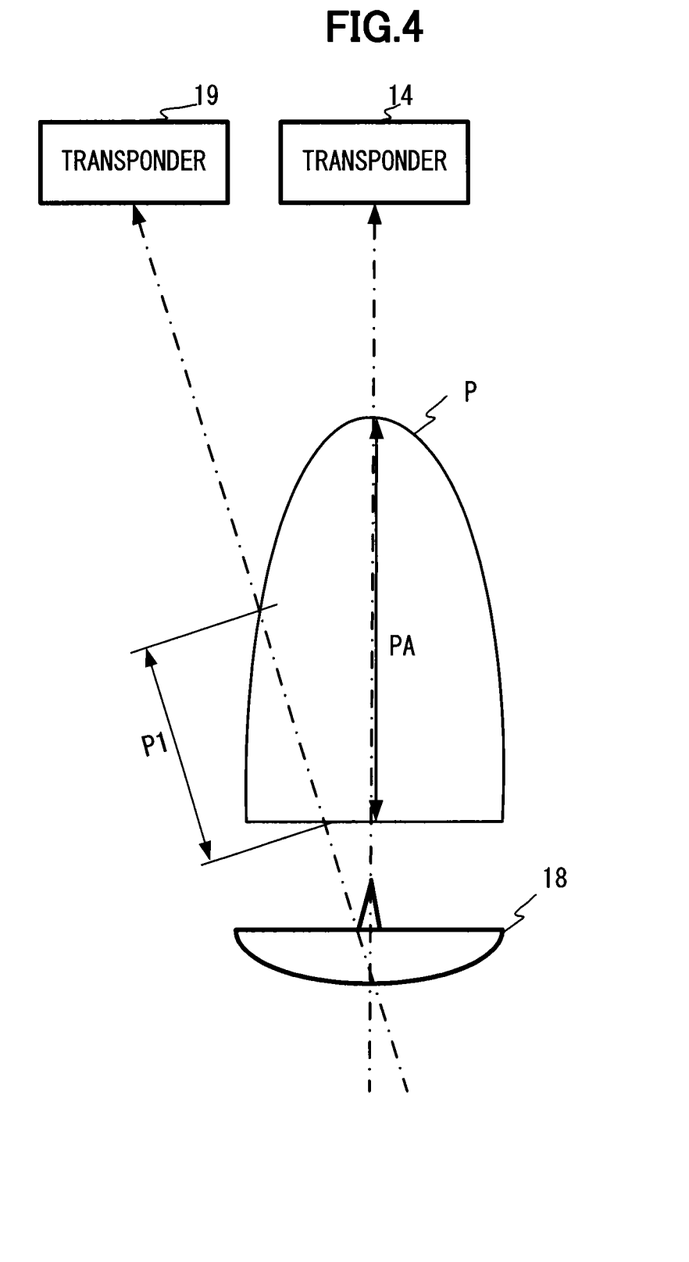
FIG. 4 is an illustration showing radio wave strength distribution P of the tracking antenna shown in FIG. 1.

The tracking antenna 18 has a directivity showing the radio field strength (transmitting energy) distribution P as shown in FIG. 4.

In this case, as shown in FIG. 4, when the oriented direction of the tracking antenna 18 is directed to the transponder 14, the radio field strength to the transponder 14 is denoted by PA. Moreover, above the equator, a plurality of geostationary satellites, such as communications satellites, meteorological satellites and/or the like, are arranged, and other geostationary satellites are arranged in front and at the back of the communications satellite on which the transponder 14 is mounted.

In this case, as shown in FIG. 4, suppose that transponder 19 adjoins to the transponder 14 and the intensity of the radio wave transmitted by the tracking antenna 18 to the transponder 19 mounted on the adjacent communications satellite is P1. In addition, the intensity P1 is designed to be less than an allowable interference limit which does not cause the transponder 19 of the communications satellite not to interfere.

Figure 5A:
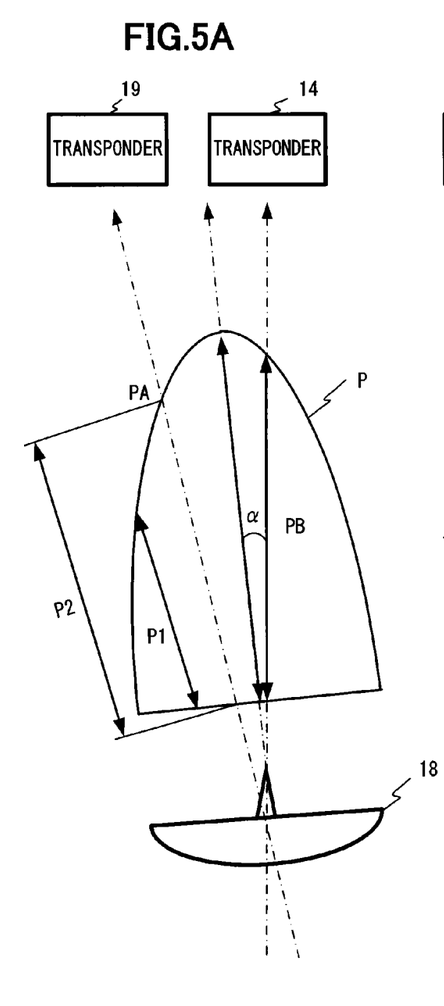
FIG. 5A shows an example in which a conventional transmission system interferes with other transponder and FIG. 5B shows an example in which the transmission system shown in FIG. 1 interferes with other transponder.

In this case, for example, as shown in FIG. 5A, when the tracking error alpha is generated, the intensity of the radio wave irradiated by the tracking antenna 18 to the transponder 14 decreases from PA to PB and the intensity of the radio wave to the adjoining transponder 19 increase to P2 from P1, when any particular control is not performed.

If this intensity P2 exceeds the allowable interference limit of the transponder 19, the transponder 19 may malfunction. Thus, as shown in FIG. 5B, the radio field strength of the tracking antenna 18 is reduced so that the intensity P3 of the radio wave irradiated by the tracking antenna 18 to the adjoining transponder 19 becomes less than the allowable interference limit of the adjoining transponder 19 and can maintain communication with the transponder 14 to be tracked. That is, the transmitting energy of the tracking antenna 18 is reduced to the energy which is less than the transmitting energy at the time when the tracking antenna 18 faces directly toward the transponder 14.

How much radio field strength (transmitting energy) is reduced is varied by the positional relationship between the transponder 14 and the adjoining transponder 19, and by the intensity distribution characteristics of the radio wave irradiated by the tracking antenna 18. For each value of tracking error alpha, a transmission level A is set to such a value that brings a situation in which the degrees of interference with the adjoining transponder 19 are less than the upper limit of an allowable range and communication with the transponder 14 is stably possible.

Figure 6A:
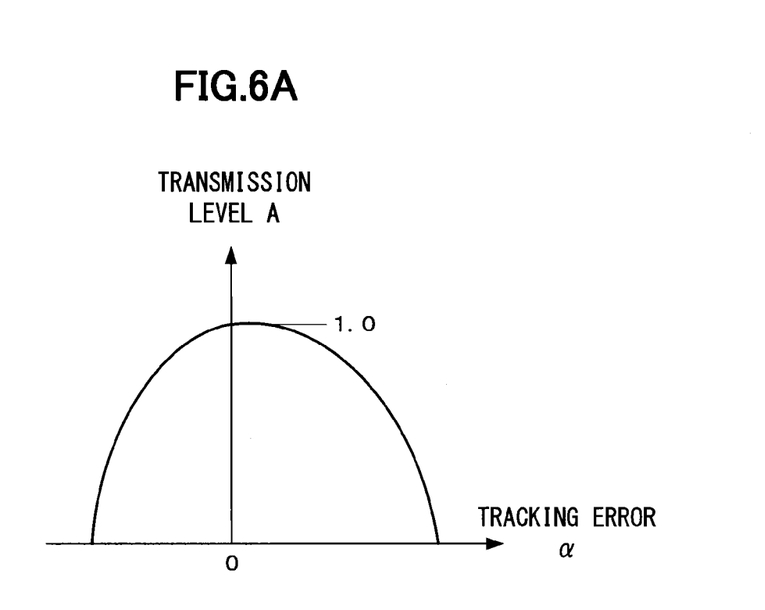
FIG. 6A shows an example of alpha-A characteristics showing the relationship of a designed tracking error alpha and a transmission level A.
Figure 6B:
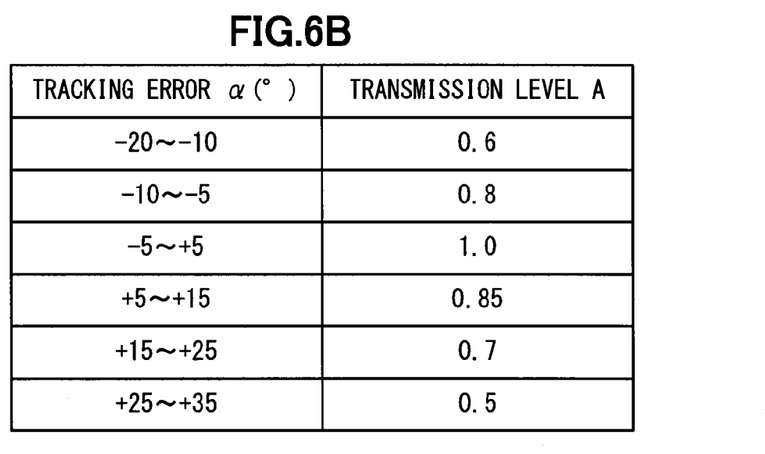
FIG. 6B shows an example of a table showing the relationship of designed tracking errors alpha and the transmission levels A.
Figure 6C:
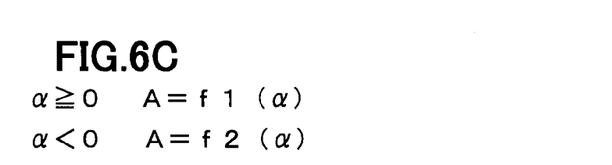
FIG. 6C shows an example of functions showing the relationship of a designed tracking error alpha and a transmission level A.

The transmission level control circuit 232 also has a function as memory means and stores an alpha-A characteristic as shown in FIG. 6A or a table as shown in FIG. 6B or functions shown in FIG. 6C or the like which are designed to show the relationship between the tracking error alpha and the transmission level A as mentioned above. In addition, although FIG. 6A shows an example of the bilaterally asymmetric alpha-A characteristic, the characteristic may be symmetrical and can be appropriately arranged depending on the arrangement or the like of neighboring communications satellites.

The transmission level control circuit 232 applies, a value of the transmission level corresponding to the tracking error alpha indicated by the tracking error signal supplied from the tracking error calculation circuit 229, to the graph of the alpha-A characteristic shown in FIG. 6A, or the table shown in FIG. 6B, or the functions f1 and f2 shown in FIG. 6C, obtains a corresponding value A, and supplies the value to the control terminal C of the transmitting amplifier 231 of the above-mentioned transmitter 226. The transmitting amplifier 231 amplifies the signal supplied from the modulator 224 at an amplification factor G and sends it to the tracking antenna 18, the amplification factor G obtained by a formula $G = A \times G_0$ in which a rated amplification factor $G_0$ is multiplied by the transmission level A indicated by the transmission level control signal to obtain G. Therefore, the transmission level control circuit 232 and the transmitter 226 cooperate to have a function for determining the transmission level A, as means for determining the transmission level A.

Then, the operation of the transmission system 10 having the above-mentioned configuration is explained.

Here, in order to understand an embodiment easily, for example, an operation is explained in which video and audio data is transmitted from the endstation facility $12_1$ to the endstation facility $12_2$ via the transponder 14.

When video and audio signals are supplied to the endstation device 16 of the endstation facility $12_1$ from outside, the video and audio encoder 222 encodes video and audio signals, respectively, generates baseband signals, and outputs the baseband signals to the modulator 224.

The modulator 224 modulates a carrier signal with the baseband signal supplied from the video and audio encoder 222, and outputs the modulated signal to the transmitter 226.

The transmitter 226 amplifies the modulated signal supplied from the modulator 224 at an amplification factor in response to the transmission level control signal supplied from the transmission level control circuit 232 to be an amplified signal into a transmitting signal, and supplies the transmitting signal to the tracking antenna 18. The tracking antenna 18 transmits the transmitting signal (transmission signal) to the transponder 14. The transponder 14 relays this radio wave to the endstation facility $12_2$.

On the other hand, from the transponder 14, tracking signals are transmitted towards the tracking antenna 18, and the tracking antenna 18 receives the tracking signals and outputs the signals to the receiver 228.

The receiver 228 demodulates the supplied tracking signal, and outputs a position signal showing the position of the transponder 14.

The tracking error calculation circuit 229 obtains the tracking error alpha from the position signal supplied from the receiver 228 and the angular information of each axis supplied from the angle sensor 18c, and outputs the obtained tracking error alpha to the servo circuit 230a.

The servo circuit 230a drives each axis motor 230b to reduce the tracking error alpha.

Concurrently with the tracking operation, the transmission level control circuit 232 obtains the transmission level A in response to the tracking error alpha and outputs a transmission level control signal to the transmitter 226.

The variable power amplifier 231 of the transmitter 226 multiplies the transmission level A supplied from the transmission level control circuit 232 by the rated amplification factor $G_0$, amplifies an input signal at an amplification factor $A \times G_0$ and outputs the amplified signal.

Figure 5B:
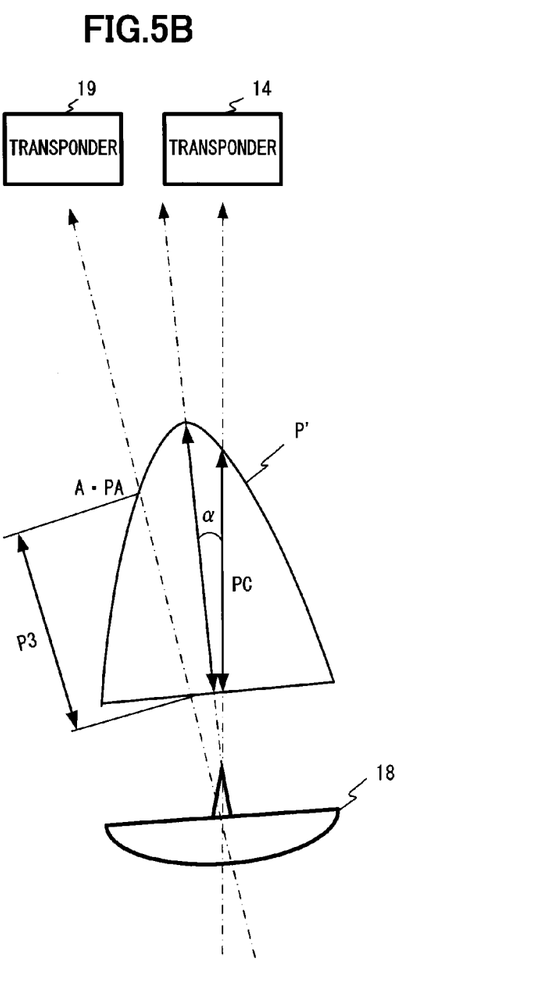

For example, if the tracking error alpha is 0, the transmission level control circuit 232 reads the value "1.0" from the table shown in FIG. 5B and outputs the transmission level control signal which shows this value "1.0." For this reason, the variable power amplifier 231 of the transmitter 226 amplifies the input signal at an amplification factor $G_0$ calculated by the formula, the rated amplification factor $G_0 \times 1.0$, and sends the amplified input signal to the tracking antenna 18. The intensity of the radio wave transmitting toward the transponder 19 adjacent to the transponder 14 tracked by the endstation facility 12 is P1, and does not exceed the allowable interference limit value of the transponder 19. A transmission trouble is not generated in the transponder 19.

On the other hand, if the tracking error alpha increases up to +12 degrees, the transmission level control circuit 232 reads the value, for example, "0.85" from the table shown in FIG. 6B, and outputs the transmission level control signal which shows this value "0.85". For this reason, the variable power amplifier 231 amplifies the input signal at an amplification factor G calculated by the formula, the rated amplification factor $G_0 \times 0.85$, and sends the amplified input signal to the tracking antenna 18. Then, when any particular process is not performed, the intensity of the radio wave irradiated to the transponder 19 may increase to P2 as shown in FIG. 5A, and may exceed the allowable interference limit value of the transponder 19, and a transmission trouble may be generated in the transponder 19.

However, as shown in FIG. 6B, as the amplification factor G of the transmitting amplifier is reduced to the rated $G_0$ multiplied by 0.85, the intensity P3 of the radio wave directed to the transponder 19, as shown in FIG. 5B, becomes about P2 multiplied by 0.85, which is below the allowable interference limit value of the transponder 19, and no transmission trouble is occurred in the transponder 19.

On the other hand, the intensity of the radio wave directed to the transponder 14 is reduced under the influence of the tracking error alpha and under the influence of the decrease of the amplification factor G of the transmitting amplifier. However, a communicable state is maintained.

In this way, according to this embodiment, when the tracking error alpha is generated, the transmission level is set, according to a predetermined attenuation characteristic, to such a value that brings a situation in which the interference with a neighboring transponder becomes equal to or less than the allowable interference limit value of that transponder, and communication with the tracking transponder 14 is stably possible. Therefore, regardless of the degree of the tracking error alpha, communications can be continued and the interference with other communication device can be suppressed.

In addition, the present scope of the claims is not limited to the above-mentioned embodiment.

Figure 7:
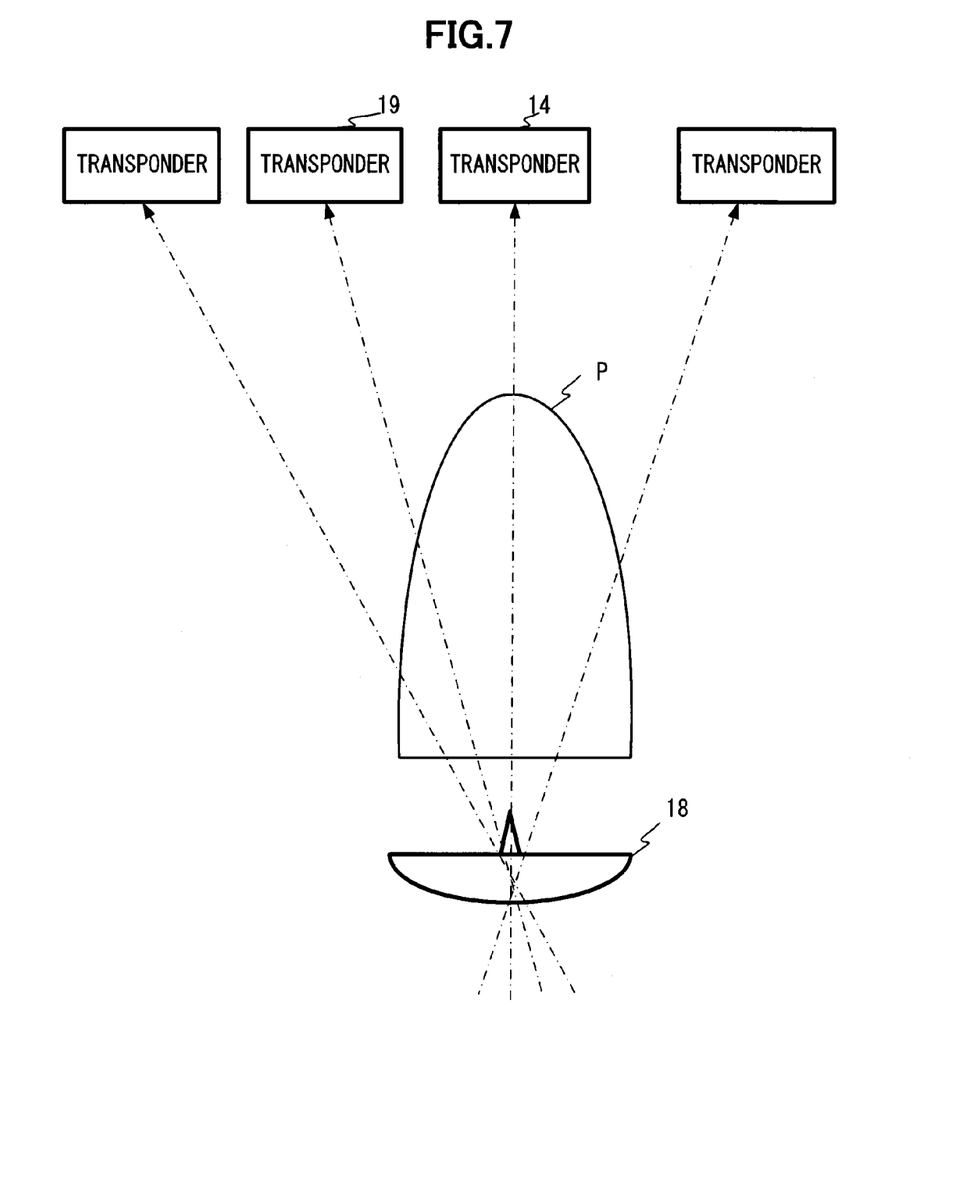
FIG. 7 is an illustration for explaining the relationship between a delay error and a transmission level.

For example, in the above-mentioned embodiment, only one transponder 19 adjoining to the transponder 14 to be tracked is shown. However, as shown in FIG. 7, a plurality of adjoining transponders may exist.

In this case, when setting a transmission level A to the transmission level control circuit 232, degrees of interferences at a plurality of adjoining transponders 19 do not exceed the upper limit of the allowable range for each value of tracking error alpha, and a transmission level A is set in which communications with the transponder 14 are stably possible. A maximum value of the transmission level A is not limited to 1.0, which may be greater than 1.0 on condition that degrees of interferences at each transponder do not exceed the upper limit of the allowable range and communications with the transponder 14 are stable.

The transmission level in which interferences do not exceed the upper limit of the allowable range and communications with the transponder 14 become possible may be logically obtained from the positional relationship and the specification of each transponder and output characteristics of the tracking antenna 18, or may be obtained experimentally. Moreover, although radio field strength (transmitting power or transmitting energy) is controlled by adjusting the amplification factor G of the variable power amplifier 231 included in the transmitter 226, a method for controlling transmitting power is not limited to this and arbitrary methods are possible. For example, the transmitting power may be controlled by other methods such as controlling the output characteristics of the antenna main body 18b.

Moreover, FIG. 6A shows an example in which the transmission level A monotonously decreases as the absolute value of the tracking error alpha becomes larger. However, the characteristic of the transmission level A may not be limited to monotonous decreasing. The transmission level A may have a local maximum, local minimum, and/or the like. Furthermore, the transmission level A may also include a value larger than 1. Moreover, as illustrated in FIG. 6B, a dead zone (−5 degrees to +5 degrees) may be set to the tracking error alpha to stabilize control. Different functions f1 and f2 are applied to determine the transmission level A in FIG. 6C where f1 is applied when the value of the tracking error alpha is 0 or positive and f2 is applied when the value of the tracking error alpha is negative. Functions are not limited to f1 and f2. Other functions may be defined. For example, three numerical ranges may be defined, positive, negative and 0. Any different functions may be applied in the positive and negative ranges, and any value of the transmission level A may be applied when the tracking error alpha is 0.

Moreover, in the above-mentioned embodiment, the transmission level control circuit 232 determines the transmission level A and amplifies an input signal at an amplification factor determined by the product of this transmission level A and the rated amplification factor $G_0$. However, for example, the transmission level control circuit 232 may store the relationship between the tracking error alpha and the amplification factor G, and may amplify a signal at an amplification factor (or radio field strength or transmitting energy) determined in response to the tracking error alpha.

Figures 8A, 8B:
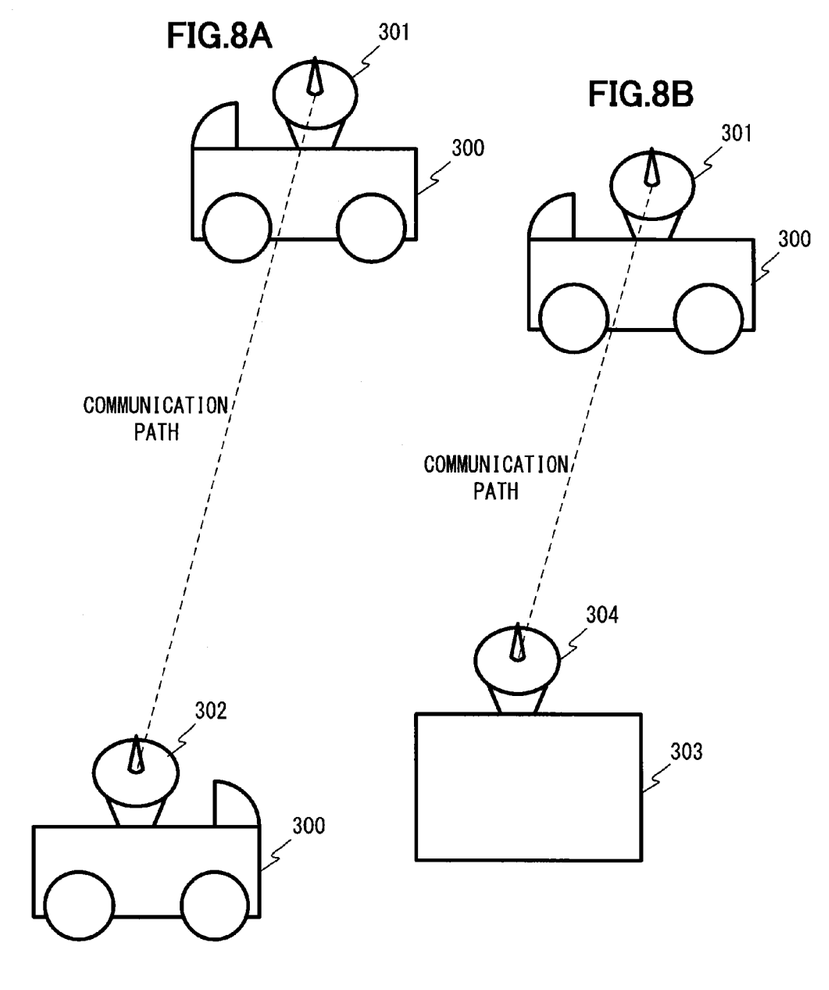
FIG. 8A and FIG. 8B are illustrations for explaining other examples of transmission systems to which the present invention is applied.

In the above-mentioned embodiment, the transmission system 10 uses the transponder 14, which is a communication device mounted on an artificial satellite, in the communication between the endstation facilities 12 which are communication devices. However, this invention is not limited to the above-mentioned embodiment. This invention is also applicable when mobile stations communicate with each other while tracking the partner station, or when a fixed station communicates with a mobile station while tracking the mobile station. As an example in which mobile stations communicate with each other while tracking the partner station, for example, as shown in FIG. 8A, there is a case in which the communication device 301 and 302 carried in vehicles 300 track and communicate with each other. Moreover, as an example in which a fixed station tracks and communicates a mobile station, for example, as shown in FIG. 8B, there is a case in which a fixed station including a communication device 304 arranged in a building 303 tracks and communicates with a mobile station which has a communication device 304 carried in the vehicles 300. In these cases, when a tracking error is generated, interferences with the communication device carried in other mobile stations can be suppressed by performing control of reducing transmitting power to a value less than a standard value.

In addition, the receiving circuit of the receiver 228, the tracking error calculation circuit 229, and transmission level control circuit 232 may be configured of a computer including a Central Processing Unit (CPU), a Digital Signal Processor (DSP), a memory, and the like. In this case, a program, that makes the CPU execute the above-mentioned operations of each component, for example, a recovery operation, an error calculation operation, a transmission level control operation and the like, is stored in the memory and the program functions and processes as each circuit by the CPU and the like executing the program. The executing program may be stored and distributed in a computer readable recording medium such as a flexible disk, a compact disk read-only memory (CD-ROM), a digital versatile disk (DVD), a Magneto-Optical disk (MO) and the like. A system that executes the above processes may be configured by installing the program. Programs may be stored in a disk device or the like held by a predetermined server on a communication network such as the Internet. The program may be, for example, superposed on the carrier to download and the like. Furthermore, when the operating system (OS) shares to perform the above functions or the OS and the application cooperates to perform the above functions, only portions except the OS may be stored and distributed, or downloaded.

The present invention makes various embodiments and modifications possible without departing from the broad spirit and scope of the present invention. Moreover, the above mentioned embodiments are for explaining the present invention, and do not limit the scope of the present invention. That is, the scope of the present invention is defined not by the embodiments but by the claims, and various modifications performed within the claims and within the scope of the meaning of the equivalent invention are deemed to be within the present invention.

This application is based on the Japanese Patent Application 2012-74629 filed on Mar. 28, 2012. The specification, claims and the whole drawings of the Japanese patent application 2012-74629 is herein incorporated by reference into this specification.

REFERENCE SIGNS LIST

10 Transmission system
12 Endstation facilities (Communication device)
14, 19 Transponder (Communication device)
16 Endstation device
18 Tracking antenna
18a Antenna stand
18b Antenna main body
18c Angle sensor
222 Video and audio encoder
224 Modulator
226 Transmitter
228 Receiver
229 Tracking error calculation circuit (Tracking error determining unit)
230 Antenna driving unit
230a Servo circuit
230b Each axis motor
231 Variable power amplifier (Transmitting amplifier)
232 Transmission level control circuit (Transmission level determining unit)

The invention claimed is:

1. A communication device comprising:
a tracking antenna that tracks a destination communication device;
a tracking error determining unit that obtains a tracking error in a tracking operation of the tracking antenna;
a transmission level determining unit that obtains a transmission level at which an interference in a communication device adjacent to the destination communication device is less than or equal to an allowable limit and a radio wave intensity directed to the destination communication device has an intensity communicable to the destination communication device in response to the obtained tracking error; and
a transmitter that transmits a transmission signal via the tracking antenna to the destination communication device with energy corresponding to the obtained transmission level.

2. The communication device according to claim 1, wherein the transmission level determining unit decreases the transmission level as an absolute value of the tracking error increases.

3. The communication device according to claim 1, comprising an amplifier that amplifies a signal with a changeable amplification factor and outputs the amplified signal to the tracking antenna;
wherein the amplifier changes the amplification factor in response to the obtained transmission level.

4. The communication device according to claim 1, wherein the transmission level determining unit includes means for storing a table or function that associates the tracking error with the transmission level, and
means for applying the tracking error to the table or function to determine the transmission level.

5. The communication device according to claim 1, wherein:
the destination communication device is a transponder mounted on a communications satellite; and
the communication device adjacent to the destination communication device is another communications satellite that is adjacent to the communications satellite.

6. The communication device according to claim 1, the communication device mounted on a mobile station or a fixed station wherein
the destination communication device is mounted on the mobile station.

7. A communication method comprising:
a tracking step of tracking a destination communication device;
a tracking error obtaining step of obtaining a tracking error in a tracking operation;
a transmission level obtaining step of obtaining a transmission level at which an interference in a communication device adjacent to the destination communication device is less than or equal to an allowable limit and a radio wave intensity directed to the destination communication device has an intensity communicable to the destination communication device in response to the obtained tracking error; and
a radio-transmitting step of radio-transmitting a signal with transmission energy corresponding to the obtained transmission level.

8. A non-transitory computer-readable recording medium that stores a program that causes a computer to execute:
a tracking step of tracking a destination communication device;
a tracking error obtaining step of obtaining a tracking error in a tracking operation in the tracking step;
a transmission level obtaining step of obtaining a transmission level at which an interference in a communication device adjacent to the destination communication device is less than or equal to an allowable limit and a radio wave intensity directed to the destination communication device has an intensity communicable to the destination communication device in response to the obtained tracking error; and
a controlling step of controlling a transmitter in response to the obtained transmission level.

9. The communication device according to claim 1, wherein:
the transmission level determining unit obtains a transmission level in response to the tracking error and a positional relationship between the destination communication device and the communication device that is adjacent to the destination communication device.

\* \* \* \* \*